(12) United States Patent
Gunatilake (10) Patent No.: US 7,860,327 B2
(45) Date of Patent: Dec. 28, 2010

(54) SYSTEMS AND METHODS FOR ENHANCED CODING GAIN

(75) Inventor: Priyan Deveka Gunatilake, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1483 days.

(21) Appl. No.: 11/245,922

(22) Filed: Oct. 6, 2005

(65) Prior Publication Data

US 2007/0081592 A1    Apr. 12, 2007

(51) Int. Cl.
  G06K 9/46    (2006.01)
  H04N 7/12    (2006.01)
  H04N 11/02   (2006.01)
  H04N 11/04   (2006.01)

(52) U.S. Cl. ............. 382/236; 375/240.01; 375/240.18; 375/240.25

(58) Field of Classification Search ................. 382/232, 382/236, 246; 375/240.01, 240.18, 240.25
See application file for complete search history.

(56) References Cited

U.S. PATENT DOCUMENTS

| | | | |
|---|---|---|---|
| 2002/0118759 A1 | 8/2002 | Enficiaud et al. | |
| 2003/0179940 A1 | 9/2003 | Lin et al. | |
| 2004/0114817 A1 | 6/2004 | Jayant et al. | |
| 2005/0207495 A1 | 9/2005 | Ramasastry et al. | |

FOREIGN PATENT DOCUMENTS

WO    WO02/23475    3/2002

OTHER PUBLICATIONS

Int'l. Appl'n. # PCT/US2006/039425, International Search Report mail date Aug. 17, 2007.
International Preliminary Report on Patentability from PCT/US2006/039425 mailed Apr. 17, 2008.
PCT International Search Report and Written Opinion of the International Searching Authority, PCT/US 06/39425, mail date: Aug. 17, 2007, pp. 1-8.
First Office Action from the State Intellectual Property Office of the People's Republic of China for App. No. 2006800372154 issued Mar. 29, 2010.

*Primary Examiner*—John B Strege
(74) *Attorney, Agent, or Firm*—Fitch, Even, Tabin & Flannery (57)   ABSTRACT

Additional data compression is achieved by enhancing the spatial and temporal correlation of the data in a pre-processing module prior to sending the data to an encoding algorithm, such as for example, the MPEG algorithm. An input frame of data is decomposed into a luminance frame and two chrominance frames. The luminance frame is transformed on the basis of each of a plurality of luminance pixels within the frame to produce a transformed luminance frame having a plurality of transformed luminance pixels. A map describing a relationship between the plurality of luminance pixels of the luminance frame and the plurality of transformed luminance pixels of the transformed luminance frame is created. The two chrominance frames are transformed according to the map to produce two transformed chrominance frames. The transformed luminance frame and the two transformed chrominance frames are integrated to produce a transformed output frame.

37 Claims, 6 Drawing Sheets

SYSTEMS AND METHODS FOR ENHANCED CODING GAIN

FIELD OF INVENTION

This relates to the distribution of digital content and data. More specifically, this relates to systems and methods for the compression of digital content and data for distribution.

BACKGROUND

A digital image is a representation of a two-dimensional image as a set of digital values, called picture elements or pixels. The pixels often are stored in a computer memory as a raster image, a two-dimensional array of small integers. Each pixel of an image is typically associated to a specific "position" in some two-dimensional region, and has a value consisting of one or more quantities (samples) related to that position.

A digital color image includes color information for each pixel. For visually acceptable results, it usually is necessary to provide at least three samples (color channels) for each pixel, which are interpreted as coordinates in some color space. The RGB color space is commonly used in computer displays, but other spaces such as YUV and HSV are often used in other contexts.

Bandwidth is a premium when distributing digital data or content, especially digital color images. Compression algorithm standards such as MPEG1, JPEG, MPEG2, JPEG2K, QuickTime, etc. have been developed and adopted for use by media applications and devices to enable digital audio/visual (AV) distribution. These compression standards achieve bandwidth compression via a variety of different algorithms that are tuned to the human perceptual characteristics and that take advantage of the spatial and temporal redundancy (or correlation) of video content.

The need for higher resolution digital media (High Definition video and beyond) and for more content (e.g., more channels) increases the requirements on bandwidth. This demand is addressed by the use of at least two complementary technology development efforts. The first is the development of sophisticated modulation schemes to increase the total available bandwidth of a given medium (e.g., 802.11x standards, MIMO modes, etc.). The second is the development of new compression algorithms that compress video at a higher rate (e.g,. MPEG4, AVC, VC1, etc.).

The bandwidth requirements for uncompressed digital video can be prohibitive, for example from 300 Mbps for Standard Definition to 2 Gbps for High Definition. Video compression algorithms can greatly reduce bandwidth requirements and often are a mandatory component in many video applications (e.g., broadcast TV over air/cable/satellite, streaming, storage, etc.) that operate in a bandwidth-constrained environment.

Fortunately, natural video is rich in spatial and temporal redundancy or correlation. Most if not all video compression algorithms take advantage of this correlation. The individual coding gain of a typical compression algorithm largely depends on its effectiveness in exploiting the spatial and temporal correlation of video. However, the algorithm needs to perform this while minimizing the loss of perceptual quality of the video. This is due to the fact that compression results in the loss of information that manifests as a degradation of perceptual quality in video. Good compression algorithms balance this trade-off by restricting the information loss to areas that are not easily perceived by the human visual system (e.g., high frequency content) while gaining significant compression.

MPEG1, MPEG2 and MPEG4 are some of the widely-used video compression algorithms in media applications. The emerging Advanced Video Coding (AVC) (MPEG4-part 10) may be the next major video algorithm. Each algorithm, starting with MPEG2, has been a significant improvement from its predecessor in terms of coding gain (compression) and picture quality. For example, the emerging AVC algorithm may have a 50% improved coding gain relative to MPEG2 for about the same picture quality. This is enabled due to AVC's use of variable data block size (e.g., 4×4, 8×8, 4×8, etc.) transforms and the use of enhanced motion estimation and compensation methods as compared with MPEG2. The variable block sizes enable better exploitation of spatial correlation while the enhanced motion estimation and compensation lead to more effective extraction of temporal correlation. In summary, video compression algorithms rely on advanced image processing techniques to obtain higher compression gains.

Yet despite these advancements in data compression, there remains a need for yet further improvements in this field.

SUMMARY OF THE ILLUSTRATED EMBODIMENTS

Additional data compression is achieved by enhancing the spatial and temporal correlation of the data in a pre-processing module prior to sending the data to an encoding algorithm, such as for example, the MPEG algorithm. Higher spatial and temporal correlation in the input data leads to higher overall compression and lower bandwidth requirements.

According to an embodiment of the invention, an input frame of data comprised of a plurality of pixels is decomposed into a first component frame and a plurality of additional component frames. The first component frame and the plurality of additional component frames are each comprised of a plurality of decomposed pixels.

The plurality of decomposed pixels of the first component frame is reordered on the basis of each of the plurality of the decomposed pixels of the first component frame to produce a first transformed frame having a plurality of transformed decomposed pixels.

A map describing a relationship between the plurality of decomposed pixels of the first component frame and the plurality of transformed decomposed pixels of the first transformed frame is created. The plurality of decomposed pixels of each of the plurality of additional component frames is reordered according to the map to produce a plurality of additional transformed frames. The first transformed frame and the plurality of additional transformed frames are integrated to produce a transformed output frame.

In one aspect, the plurality of decomposed pixels of the first component frame are luminance pixels.

In another aspect, the map is encoded using a variable-length coding algorithm to produce a compressed map.

In another aspect the compressed map and the transformed output frame are transmitted to an encoder.

In yet another aspect the encoder is an MPEG1 encoder, an MPEG2 encoder, an MPEG4 encoder, or an AVC encoder.

There are additional aspects to the present inventions. It should therefore be understood that the preceding is merely a brief summary of some embodiments and aspects of the present inventions. Additional embodiments and aspects are referenced below. It should further be understood that numerous changes to the disclosed embodiments can be made without departing from the spirit or scope of the inventions. The preceding summary therefore is not meant to limit the scope of the inventions. Rather, the scope of the inventions is to be determined by appended claims and their equivalents.

BRIEF DESCRIPTION OF THE DRAWINGS

These and/or other aspects and advantages of the present invention will become apparent and more readily appreciated from the following description of certain embodiments, taken in conjunction with the accompanying drawings of which.

DETAILED DESCRIPTION

Reference will now be made in detail to embodiments of the present invention, examples of which are illustrated in the accompanying drawings, wherein like reference numerals refer to like elements throughout. It is understood that other embodiments may be used and structural and operational changes may be made without departing from the scope of the present invention.

Disclosed are methods and systems for achieving additional data compression. Embodiments of the invention achieve this by enhancing the spatial and temporal correlation of the data in a pre-processing module prior to sending the data to an encoding algorithm, such as for example, the MPEG algorithm. Higher spatial and temporal correlation in the input data leads to higher overall compression and lower bandwidth requirements.

Figure 1:
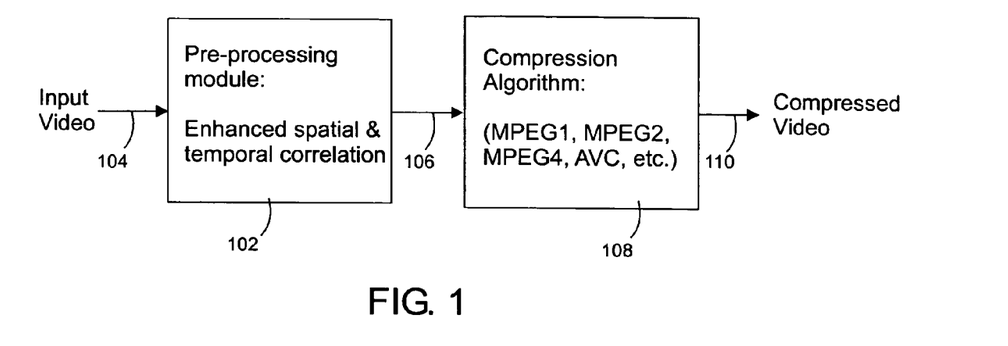
FIG. 1 is a simplified, functional block diagram of a method of enhanced coding gain according to an embodiment of the invention.

FIG. 1 is a simplified, functional block diagram of a method of enhanced coding gain according to an embodiment of the invention. A pre-processing module 102 receives uncompressed data 104, such as for example, video data, and performs a spatial and temporal correlation enhancement of the input data as will be described in further detail below. Correlation-enhanced data 106 is then fed into a compression algorithm or encoder 108 that will compress this data more effectively to produce correlation-enhanced data 110. Exemplary compression algorithms include MPEG1, MPEG2, MPEG4, AVC, etc. The coding gain of the method is the difference in compression of the correlation-enhanced video data (in accordance with embodiments of the invention) and unprocessed (normal) video data. Given that higher spatial and temporal correlation leads to improved overall compression, the method of FIG. 1 yields a significant coding gain.

Figure 2:
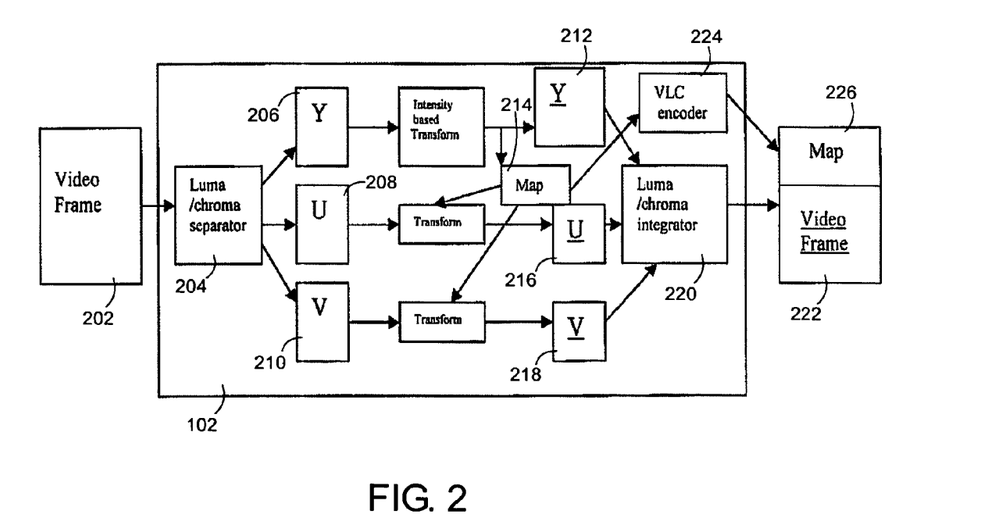
FIG. 2 is a simplified process diagram of a method of enhancing the spatial and temporal correlation of data in accordance with the embodiment of FIG. 1.

FIG. 2 is a simplified process diagram of a method for enhancing the spatial and temporal correlation of data in accordance with the embodiment of FIG. 1. An intensity-based reordering of the individual pixels of a frame is used. Input data, in this case a frame 202 of video data in uncompressed YUV format, is fed into the pre-processing module 102.

The YUV format defines a color space in terms of one luminance and two chrominance components. Y stands for the luminance component (the brightness) and U and V are the chrominance (color) components. Therefore, each pixel in the frame is comprised of three values, one value for the Y component and two values for the U and V components. YUV signals are created from an original RGB (red, green and blue) source. The weighted values of R, G and B are added together to produce a single Y signal, representing the overall brightness, or luminance, of that spot. The U signal is then created by subtracting the Y from the blue signal of the original RGB, and then scaling. The V signal is created by subtracting the Y from the red, and then scaling by a different factor. While the illustrated embodiments use data in YUV format, other embodiments may use other data formats as well.

After the frame 202 of uncompressed YUV data is received by the pre-processing module 102, the frame 202 first is directed to a luma/chroma separator 204. The luma/chroma separator 204 decomposes the frame 202 into a luminance frame (Y) 206 having a plurality of luminance pixels and two chrominance frames (U, V) 208, 210, each of which having a plurality of chrominance pixels. Next, the plurality of luminance pixels in the luminance frame 206 is transformed on the basis of each of the individual luminance pixels. The transformation is done via a reordering of the luminance pixels within the incoming luminance frame 206 to produce a transformed luminance frame (Y) 212 having a plurality of transformed luminance pixels. In other words, for example, a pixel at location 0, 0 in the incoming video frame 202 may have a luminance value such that when it is reordered according to that value in relation to the luminance values of the other pixels in the frame 202, the luminance component of that pixel would be placed at location 8, 8 in the reordered, or transformed, luminance frame (Y) 212.

Figure 5:
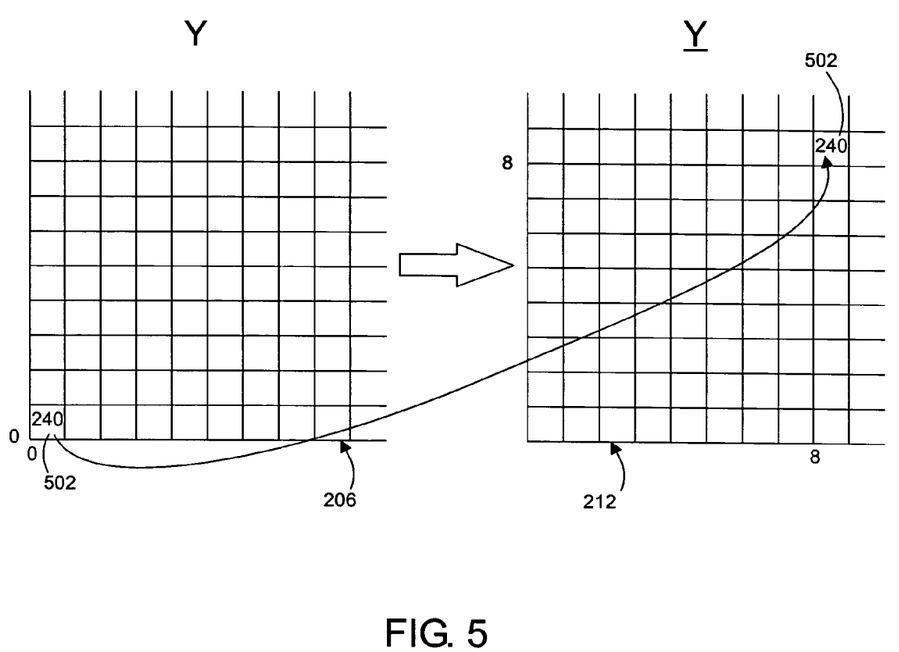
FIG. 5 is a simplified diagram of the transformation of a frame of data in accordance with an embodiment of the invention.

FIG. 5 illustrates an embodiment of this reordering process. Shown is a lower left section or portion of the luminance frame 206 (Y) of FIG. 2. Located at position 0, 0 (based on an X-Y axis grid frame of reference) is an exemplary luminance pixel 502 having value of 240. (For an 8-bit pixel system, the luminance values range from 0 to 255 for each pixel.) After the luminance pixels in the luminance frame 206 are reordered according to their value, the transformed luminance frame 212 (Y) (FIG. 2) is produced.

In FIG. 5, the lower left portion of this transformed luminance frame 212 is shown with the exemplary luminance pixel 502 reordered or placed in a different location, in this case the 8, 8 location, according to its luminance value of 240. In an exemplary ordering scheme where the pixels with the highest luminance values are placed at or near the lower left position (i.e., position 0, 0) of the transformed frame 212, and the pixels with the lowest luminance values are placed at or near the upper right corner (not shown) of the frame 212, then in the case of FIG. 5, luminance pixels that are located above and to the right of the exemplary pixel 502 would have values that are the same or less than the 240 value of the exemplary pixel 502. On the other hand, luminance pixels located below and to the left of the exemplary pixel 502 would have values that are the same or greater than the 240 value.

Returning to FIG. 2, a map 214 describing the relationship between the plurality of luminance pixels of the luminance frame 206 and the plurality of transformed luminance pixels of the transformed luminance frame 212 is created. In other words, for example, where the luminance pixel that was originally located at the 0, 0 position is transformed to position 8, 8, then the map 214 would provide information so that this luminance pixel can be restored to its original location of 0, 0 when desired. Thus it can be appreciated that this is a lossless, reversible process whereby the original luminance image frame (Y) 206 can be recreated using the transformed luminance frame (Y) 212 data and the map 214. The map 214 can be one or more of any number of data structures or relationships, including a table, a database, an equation, a list, etc.

The chrominance frames (U, V) 208, 210 are similarly transformed to produce transformed chrominance frames (U, V) 216, 218. That is, the plurality of chrominance pixels in each of the two chrominance frames is reordered. This transformation is according to the same map 214 that was previously generated for the transformed luminance frame (Y) 212. In other words, for example, where the exemplary luminance pixel originally at location 0, 0 was transformed to location 8, 8 in the transformed luminance frame 212, then the corresponding U and V values for that same pixel will likewise be placed in locations 8, 8 in their respective, transformed chrominance frames 216, 218 as directed by the previously-created map 214.

As described above, individual decomposed pixels in a component frame are reordered based upon the intensity level or value of each luminance pixel and placed in a transformed frame. In an alternative embodiment, however, the reordering is based upon a block of luminance pixels rather than upon individual luminance pixels. An input component frame is treated as a plurality of data blocks, such as for example 4×4 blocks, or 8×8 blocks, etc. of pixels. A single block value that is a function of the individual luminance pixels in that block is calculated. This single block value could be the sum of the individual luminance pixels in the block, the average of the individual luminance pixels, etc. Then rather than reordering individual pixels, the data blocks themselves are reordered based on the calculated single block values and placed in the transformed frame as data blocks. As before, a map is created for reconstituting the component frame. An advantage of this approach is that there will be fewer data points with which to transform and thus a faster process will result.

Figure 6A:
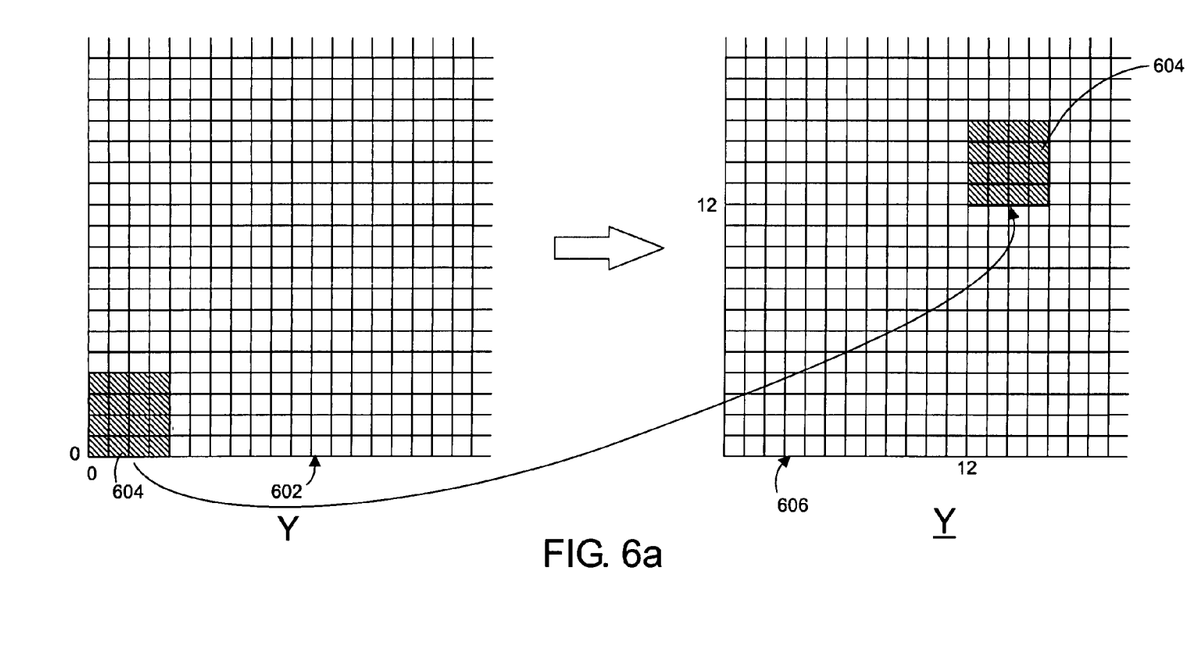
FIGS. 6a and 6b are simplified diagrams of the transformation of a frame of data in accordance with an alternative embodiment of the invention.
Figure 6B:
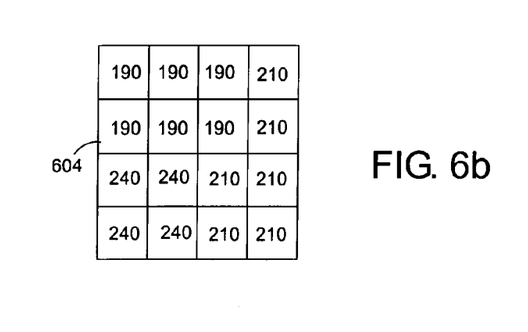

FIGS. 6a and 6b illustrate an embodiment of this block-based transformation of pixels. Shown is a lower left section or portion of a luminance frame 602 (Y) of data that is created by decomposing an input frame into the luminance frame 602 and two chrominance frames (not shown). An exemplary data block 604 is comprised of a 4×4 block of luminance pixels extending up and to the right of position 0, 0 on the frame 602. In this example, the exemplary data block 604 is comprised of 16 luminance pixels ranging in value from 190 to 240. (FIG. 6b) A single block value is calculated that is a function of the 16 individual luminance pixels in the exemplary block 604. In this case, the function is merely an addition function, so that the single block value representative of the entire block is the sum of these 16 values, or 3,360.

The rest of the luminance frame 602 is similarly processed by using 4×4 blocks whereby a single data block value is calculated for each block that is representative of the 16 luminance values in each block. A transformed luminance frame 606 is then created based upon this reordering of the 4×4 data blocks according to their respective data block values. Thus the exemplary data block 604 in the original luminance frame 602 is re-located in the transformed frame 606 to a location that extends upward and to the right of position 12, 12 in the transformed frame 606. This location of the now transformed exemplary data block 604 is based upon its data block value of 3,360 in relation to the data block values for the other blocks in the original frame 602.

Thus in an ordering system where the transformed data blocks are ordered with the highest data block values located at or near the lower left position (i.e. at 0, 0), and the lowest data block values located at or near the upper right corner (not shown) of the transformed frame 606, then in the case of FIG. 6a, transformed data blocks located above and to the right of the transformed exemplary data block 604 would have data block values that are less than or equal to 3,360, whereas transformed blocks located below and to the left of the transformed exemplary block would have data block values that are greater than or equal to 3,360. Note, however, that the individual luminance pixels within each transformed data block remain unchanged (both as to value and relative position within the block) as they are transformed to their new location.

As before, a map (not shown in FIG. 6a) describing the relationship between the plurality of luminance data blocks of the luminance frame 602 and the plurality of transformed luminance data blocks of the transformed luminance frame 606 is created so that the original luminance frame 602 can be restored in a lossless manner. Similarly, the chrominance frames (U, V) are transformed on this 4×4 data block basis using data block locations as directed by the same map. That is, the plurality of chrominance data blocks in each of the two chrominance frames are reordered according to this map to produce two transformed chrominance frames.

Returning again to FIG. 2, all of the transformed frames (Y, U, and V) 212, 216, 218 are next sent to a luma/chroma integrator 220 where they are integrated into a single, transformed video frame 222 so that the Y, U, and V pixels are recombined, but at their transformed location. This integration is necessary to place the data in a format that is usable by the encoder 108 (FIG. 1).

The data in the map 214 is encoded (i.e., compressed) using a variable-length coding (VLC) algorithm or encoder 224, such as for example, the Content-Adaptive Variable length coding (CAVLC) algorithm or the Content-Adaptive Binary Arithmetic Coding (CABAC) algorithm. Thus the output of the pre-processing module 102 is the transformed video frame 222 and VLC encoded map data 226, all of which is sent to the encoder 108 (FIG. 1). The VLC encoded map data 226 can be included in the user data (i.e., the so called "private" data) section of the compression algorithm 108 which will pass this data without further operation upon it. While the illustrated embodiment encodes the map 214 using a VLC encoder, other embodiments may use other types of encoders or compression algorithms.

According to the MPEG standard, the unit of pictures or frames upon which an algorithm performs compression is known as a Group Of Pictures (GOP). Compressed pictures within a GOP are related to each other spatially and temporally (through prediction). In MPEG2, three "picture types" are defined. The picture type defines which prediction modes may be used to code each block.

"Intra" pictures (I-pictures) are coded without reference to other pictures. Moderate compression is achieved by reducing spatial redundancy, but not temporal redundancy. They can be used periodically to provide access points in the bitstream where decoding can begin.

"Predictive" pictures (P-pictures) can use the previous I- or P-picture for motion compensation and may be used as a reference for further prediction. Each block in a P-picture can either be predicted or intra-coded. By reducing spatial and temporal redundancy, P-pictures offer increased compression compared to I-pictures.

"Bidirectionally-predictive" pictures (B-pictures) can use the previous and next I- or P-pictures for motion-compensation, and offer the highest degree of compression.

The different picture types typically occur in a repeating sequence, which is the GOP. A typical GOP in display order is:

$B_1 \ B_2 \ I_3 \ B_4 \ B_5 \ P_6 \ B_7 \ B_8 \ P_9 \ B_{10} \ B_{11} \ P_{12}$

The corresponding bitstream order is:

$I_3 \ B_1 \ B_2 \ P_6 \ B_4 \ B_5 \ P_9 \ B_7 \ B_8 \ P_{12} \ B_{10} \ B_{11}$

A regular GOP structure can be described with two parameters: N, which is the number of frames or pictures in the GOP, and M, which is the spacing of P-pictures. The GOP in the above example is described as N=12 and M=3.

According to an embodiment of the invention, where the GOP structure is comprised of N frames, the first video frame, frame number 1 (i.e. frame "$I_3$" as identified above), undergoes the above-described steps to generate a transformed video frame number 1 and a map. However, the remaining frames in the GOP, i.e., video frames 2-N, will forego the generation of another map, and will only undergo a transformation according to the following steps: First, frame number 2 undergoes luma/chroma separation to create luminance and chrominance frames. Next, each of these frames are intensity transformed based on the map that was generated for video frame number 1. Then, the luminance and chrominance frames are recombined to generate a transformed video frame number 2. This process is repeated for each of the remaining input video frames 3 through N of the GOP so that each frame is transformed using the map that was generated for frame number 1. By using the same map for each frame in a GOP, a significant reduction in data transmittal is realized.

Figure 3:
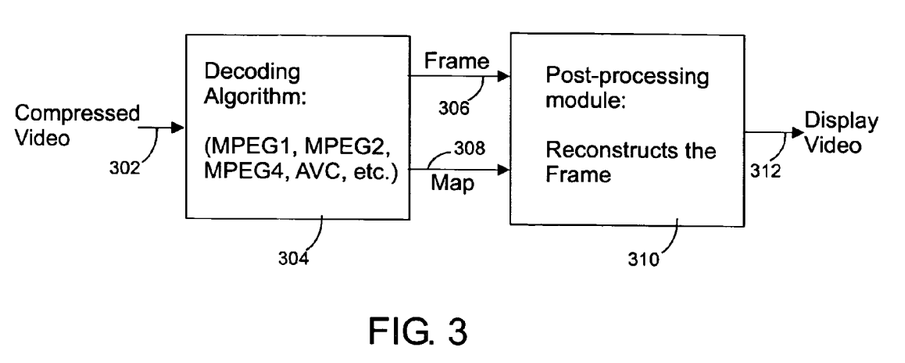
FIG. 3 is a simplified, functional block diagram of a decoding process in accordance with an embodiment of the invention.

Referring now to FIG. 3, there is shown a simplified diagram of a decoding process in accordance with an embodiment of the invention. Compressed video data 302 that has been pre-processed, such as in the manner described above, and then encoded via a compression algorithm, such as MPEG, is introduced into a first decoder 304 that corresponds with the algorithm that encoded the data. Exemplary algorithms may include MPEG1, MPEG2, MPEG4, AVC, etc. Then decoded frame data 306 as well as map data 308 are sent to a post-processing module 310 which basically reverses the previously-described, pre-processing method in order to reconstruct each incoming frame based on the decoded frame 306 and the map 308 and in order to produce display video 312.

Figure 4:
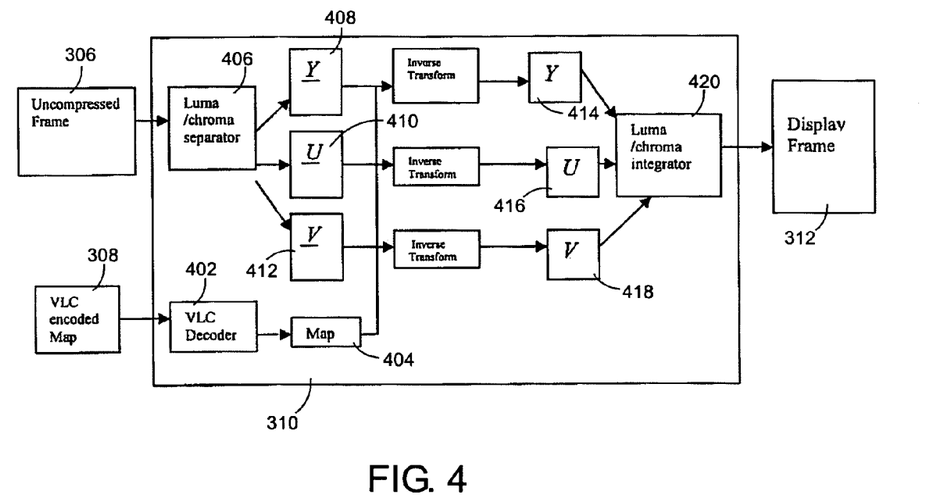
FIG. 4 is a simplified process diagram of a method of reconstructing spatially and temporally correlated data in accordance with the embodiment of FIG. 3.

FIG. 4 shows the operational flow of the post-processing module 310 of FIG. 3 in accordance with an embodiment of the invention. The map data 308 which has been VLC encoded is received by the post-processing module 310 where this map data is sent to a VLC decoder 402 to restore an original decoded or uncompressed map 404. Assuming the video data is a GOP of N frames, the first decoder 304 (FIG. 3) outputs transformed frame 1 (306) of N frames and sends this transformed frame 306 to a luma/chroma separator 406. (At this point, the frames and their data are referred to as "transformed" since each frame comprises pixel data that has been reordered within each frame according to individual luminance pixels as previously described.) The luma/chroma separator 406 decomposes the transformed frame number 1 (306) into one transformed luminance frame ($\underline{Y}$) 408 comprised of transformed luminance pixels, and into two transformed chrominance frames ($\underline{U}$, $\underline{V}$) 410, 412 of transformed chrominance pixels.

The uncompressed map 404 is used for the inverse transforming of each of the transformed luminance and chrominance frames ($\underline{Y}$, $\underline{U}$, $\underline{V}$) 408, 410, 412 to create reconstructed luminance and chrominance frames (Y, U, V) 414, 416, 418. These reconstructed luminance and chrominance frames are then sent to a luma/chroma integrator 420 which combines or integrates these frames to produce a display frame 312 as the output of the post-processing module 310. For the remaining transformed frames numbered 2-N of the GOP, the above-described process is repeated, except that no further map data is received or decoded. In other words, the same map 404 that was used for inverse transforming frame number 1 is also used for inverse transforming the remaining transformed frames numbered 2-N of that GOP. However, new map data is received and processed for the first transformed frame of the next GOP, whereupon the above-described process is repeated.

As previously mentioned, while the illustrated embodiments use data in a YUV format, other embodiments may use other data formats as well. Thus an alternative embodiment of a method for enhancing the spatial and temporal correlation of data is described. An input frame of data comprised of a plurality of pixels is decomposed into a first component frame and a plurality of additional component frames. The first component frame and the plurality of additional component frames are each comprised of a plurality of decomposed pixels.

The plurality of decomposed pixels of the first component frame is reordered on the basis of each of the plurality of the decomposed pixels of the first component frame to produce a first transformed frame having a plurality of transformed decomposed pixels. A map describing a relationship between the plurality of decomposed pixels of the first component frame and the plurality of transformed decomposed pixels of the first transformed frame is created. The plurality of decomposed pixels of each of the plurality of additional component frames is reordered according to the map to produce a plurality of additional transformed frames. Finally, the first transformed frame and the plurality of additional transformed frames are integrated to produce a transformed output frame.

Moreover, data formats other than the YUV format also may be used in transforming data on a data block basis. Thus for example in an alternative embodiment, an input frame of data is decomposed into a first component frame and a plurality of additional component frames, wherein each of these frames has a plurality of data blocks. Each of the plurality of data blocks has a plurality of decomposed pixels.

A data block value is calculated for each of the plurality of data blocks of the first component frame. Each data block value is a function of the plurality of decomposed pixels in that data block of the first component frame. The plurality of data blocks of the first component frame is reordered on the basis of each of the data block values to produce a first transformed frame having a first plurality of transformed data blocks.

A map is created that describes a relationship between the plurality of data blocks of the first component frame and the first plurality of transformed data blocks of the first transformed frame. The plurality of data blocks of each of the plurality of additional component frames is reordered according to the map to produce a plurality of additional transformed frames. Finally, the first transformed frame and the plurality of additional transformed frames are integrated to produce a transformed output frame.

Figure 7:
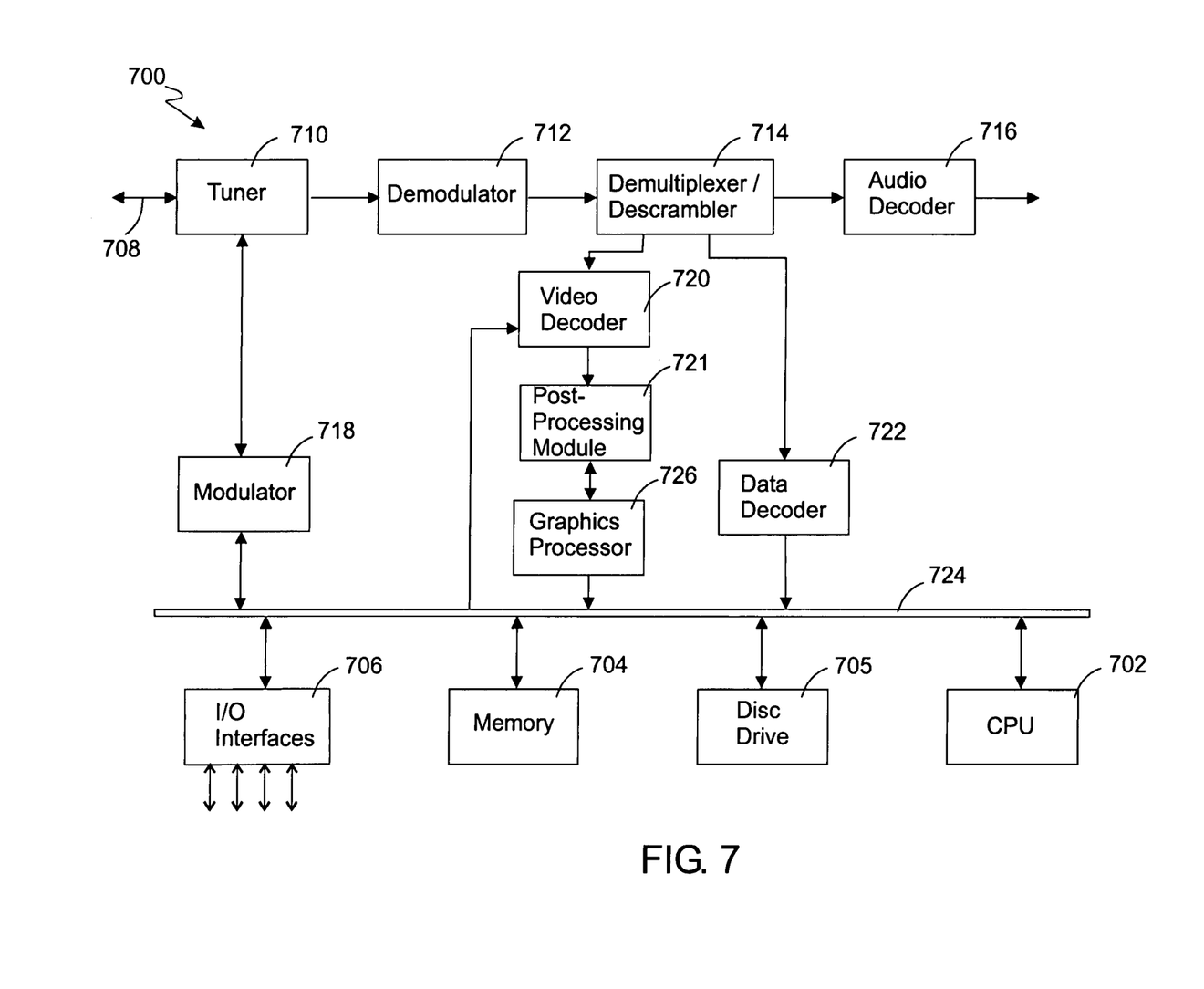
FIG. 7 is a simplified block diagram of a receiving device in accordance with an embodiment of the invention.
Figure 8:
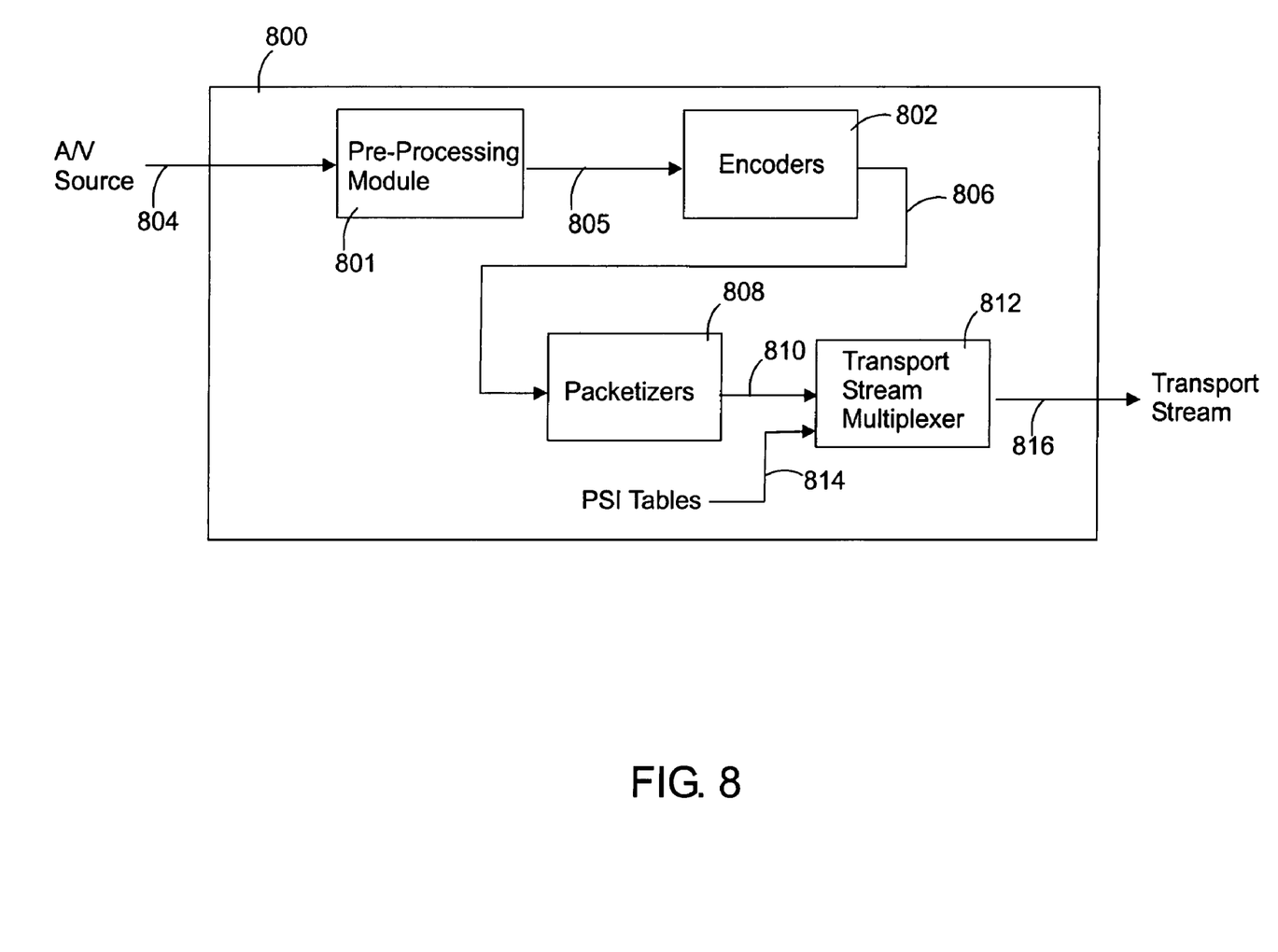
FIG. 8 is a simplified block diagram of circuitry for generating an audio/video transport stream in accordance with an embodiment of the invention.

FIGS. 7 and 8 show exemplary hardware environments in which embodiments of the invention may operate. Shown in FIG. 7 is an exemplary receiving device that is a set top box 700. The set top box 700 includes a central processing unit (CPU) 702 and memory 704 (such as Random Access Memory (RAM), Read Only Memory (ROM), or flash memory), and a disc drive 705, such as a hard disc drive, floppy disc drive, optical disc drive or may accommodate other mass storage or electronic storage media. Such memory and storage media are suitable for storing data as well as program instructions for processes to be executed by the CPU 702. Information and programs stored on the electronic storage media or memory may also be transported over any suitable transmission medium.

The set top box 700 includes circuitry suitable for audio decoding and processing, the decoding of video data compressed in accordance with a compression standard such as the Motion Pictures Experts Group (MPEG) standard and other processing. It is noted that these components may be incorporated into a television (not shown), thus eliminating the set top box 700. In addition, a computer may substitute for the television or the set top box 700 or both. The computer may include a variety of devices capable of generating video media including a tuner card coupled to a digital network, cable television network, or DSS (digital satellite system) network.

The set top box 700 includes input/output interfaces 706 that may be used with any device suitable for controlling the set top box 700, such as a remote control, an infrared receiver, a wireless radio frequency receiver, a wired connection interface, a personal digital assistant, a laptop computer, a keyboard, or a computer mouse. In addition, an input device in the form of a control panel (not shown) located on the television or the set top box 700 can be provided.

The set top box 700 may also be coupled to an Internet service provider (ISP) host by a suitable connection including dial-up connections, DSL (Digital Subscriber Line) or a transmission medium 708 (e.g. using a cable modem) connected to a tuner 710 to provide access to services and content from the ISP and the Internet. The set top box 700 may also be used as an Internet access device to obtain information and content from remote servers via the Internet.

Still referring to FIG. 7, the set top box 700 further includes a demodulator 712, a demultiplexer/descrambler 714, an audio decoder 716, a modulator 718, a video decoder 720, a post-processing module 721, a data decoder 722, a system bus 724, and a graphics processor 726. The transmission medium 708, such as a coaxial cable, is coupled by a suitable interface to the tuner 710. The tuner 710 may include a broadcast in-band tuner for receiving content, an out-of-band ("OOB") tuner for receiving data transmissions and a return path tuner for providing an OOB return path for outbound data. A separate tuner (not shown) may be provided to receive conventional RF broadcast television channels.

The demodulator 712 may demodulate any modulated information from the tuner 710 such as MPEG-2 formatted data. The demultiplexer/descrambler circuit 714 separates the demodulated information into discrete channels of programming. The programming is divided into packets, each packet bearing a Packet ID (PID) value that identifies the packet as containing a particular type of data (e.g. audio, video, and data). The demultiplexer/descrambler circuit 714 also decrypts encrypted information in accordance with a decryption algorithm to prevent unauthorized access to programming content, for example.

Audio packets from the demultiplexer/descrambler circuit 714 (those identified with an audio PID) are decrypted and forwarded to the audio decoder 716. The audio decoder 716 may convert the audio packets to analog audio to drive a speaker system (e.g. stereo or home theater multiple channel audio systems) or other audio system (e.g. stereo or home theater multiple channel amplifier and speaker systems) or may simply provide decoded audio output. Video packets from the demultiplexer/descrambler circuit 714 (those identified with a video PID) are decrypted and forwarded to the video decoder 720. Similarly, data packets from the demultiplexer/descrambler circuit 714 (those identified with a data PID) are decrypted and forwarded to the data decoder 722.

The data decoder 722 transmits decoded data packets to the CPU 702 via the system bus 724. Compressed map data located within the decoded data packets is identified by the CPU 702 and transmitted to the video decoder 720 via the system bus 724. The video decoder 720 passes the compressed map data and video data in the form of transformed video frames to the post-processing module 721 which uses the compressed map data to reconstruct the transformed video frames as generally described with reference to FIGS. 3 and 4 above. Video frames are then sent to the graphics processor 726 which is computer-optimized to rapidly process graphics information. The graphics processor 726 is also coupled to the system bus 724 and operates under the control of the CPU 702.

The set-top box 700 may include any of a plurality of I/O (Input/Output) signals at the I/O interfaces 706 for interconnection with other devices. By way of example, and not limitation, a serial RS-232 signal may be provided at one port to enable interconnection to any suitable serial device supported by the set top box's internal software. Similarly, communication with appropriately compatible devices can be provided with the I/O interfaces via an Ethernet port, a USB (Universal Serial Bus) port, an IEEE 1394 (Firewire or I-Link) port, S-video port, or infrared port. These interfaces may be used to interconnect the set top box 700 with any of a variety of devices such as storage devices, audio/visual devices, gaming devices and Internet appliances. (not shown)

I/O interfaces 706 can further include a PS/2 or other keyboard/mouse/joystick coupled to a port and that may be used to enable data entry into the set top box 700. The set top box 700 also may include a basic video output port for direct connection to a television set. In some embodiments, the video output port may be coupled directly to the graphics processor 726 or the demultiplexer/descrambler 714 rather than passing through the system bus 724 as shown in FIG. 7.

The input/output interfaces 706 may include the infrared port that may be embodied as an infrared receiver and may receive commands from an infrared remote control, infrared keyboard or other infrared control device. Although not shown, front panel controls may be used in some embodiments to directly control the operation of the set top box 700 through a front panel control interface coupled to the I/O interfaces 706. Selected interfaces such as those described above and others can be provided in the set top box 700 in various combinations as required or desired.

The set top box 700 also includes the disc drive 705 for storage of content and data as well as providing storage of programs (software code) for operating the CPU 702. The set top box 700 may also include other storage mediums such as a floppy disc drive, CD ROM drive, CD R/W drive, DVD drive, and others. The CPU 702 is coupled through the system bus 724 to the memory 704. The memory 704 may include any suitable memory technology including Random Access Memory (RAM), Read Only Memory (ROM), Flash memory, Electrically Erasable Programmable Read Only Memory (EEPROM), and others.

Referring now to FIG. 8, there is shown a high-level block diagram of circuitry 800 suitable for generating an audio/video transport stream in accordance with embodiments of the invention. The circuitry 800 includes a pre-processing module 801 which receives uncompressed audio/video data and performs spatial and temporal correlation enhancement of this data as generally described above in connection with FIGS. 1 and 2. The pre-processing module 801 sends transformed frame and compressed map data 805 to one or more encoders 802, which encode the transformed frame data according to MPEG-2 audio/video compression standards. The encoders 802 may be circuitry that encodes audio, data, and video according to MPEG-2 standards and outputs the coded video, coded audio, or other coded bit streams as at least one elementary stream (ES) 806. The source material 804 may be a movie, a television program, a music video, a computer game, or other source material suitable for MPEG-2 encoding.

The elementary stream (ES) 806 is delivered to one or more packetizers 808 (typically an audio packetizer and a video packetizer), which packetizes the elementary stream (ES) 806 into a packetized elementary stream (PES) 810. The packetized elementary stream (PES) 810 is delivered to a Transport Stream (TS) multiplexer 812, which multiplexes individual packetized elementary streams (PES) 810 with each other and with any Program Specific Information (PSI) tables 814 (e.g., tables that include the identities of the video and audio elementary streams (ES), the map data produced by the pre-processing module 801, and other information needed by receiving devices to demultiplex and present programs) to produce the Transport Stream (TS) 816.

Thus disclosed are methods and systems for achieving additional data compression. Embodiments of the invention achieve this by enhancing the spatial and temporal correlation of the data in a pre-processing module prior to sending the data to an encoding algorithm, such as for example, the MPEG algorithm. Higher spatial and temporal correlation of the input data lead to higher overall compression and lower bandwidth requirements.

While the description above refers to particular embodiments of the present invention, it will be understood that many modifications may be made without departing from the spirit thereof. The claims are intended to cover such modifications as would fall within the true scope and spirit of the present invention. The presently disclosed embodiments are therefore to be considered in all respects as illustrative and not restrictive, the scope of the invention being indicated by the claims rather than the foregoing description, and all changes which come within the meaning and range of equivalency of the claims are therefore intended to be embraced therein.

What is claimed is:

1. A method comprising:
   decomposing an input frame into a first component frame and a plurality of additional component frames, wherein the input frame is comprised of a plurality of pixels, and wherein each of the first component frame and the plurality of additional component frames is comprised of a plurality of decomposed pixels;
   reordering the plurality of decomposed pixels of the first component frame on the basis of each of the plurality of the decomposed pixels of the first component frame to produce a first transformed frame having a plurality of transformed decomposed pixels;
   creating a map describing a relationship between the plurality of decomposed pixels of the first component frame and the plurality of transformed decomposed pixels of the first transformed frame;
   reordering the plurality of decomposed pixels of each of the plurality of additional component frames according to the map to produce a plurality of additional transformed frames; and
   integrating the first transformed frame and the plurality of additional transformed frames to produce a transformed output frame.

2. The method of claim 1 wherein the plurality of decomposed pixels of the first component frame are luminance pixels.

3. The method of claim 1 further comprising encoding the map to produce a compressed map.

4. The method of claim 3 wherein the map is encoded using a variable-length coding algorithm.

5. The method of claim 3 wherein the map is encoded using one of a Content-Adaptive Variable length coding algorithm and a Content-Adaptive Binary Arithmetic Coding algorithm.

6. The method of claim 1 further comprising:
   encoding the map to produce a compressed map; and
   transmitting the compressed map and the transformed output frame to an encoder.

7. The method of claim 6 wherein the encoder is one of an MPEG1 encoder, an MPEG2 encoder, an MPEG4 encoder, and an AVC encoder.

8. A method comprising:
   decomposing an input frame into a luminance frame and two chrominance frames, the luminance frame having a plurality of luminance pixels, and each of the two chrominance frames having a plurality of chrominance pixels;
   reordering the plurality of luminance pixels on the basis of each of the plurality of luminance pixels to produce a transformed luminance frame having a plurality of transformed luminance pixels;
   creating a map describing a relationship between the plurality of luminance pixels of the luminance frame and the plurality of transformed luminance pixels of the transformed luminance frame;
   reordering the plurality of chrominance pixels in each of the two chrominance frames according to the map to produce two transformed chrominance frames; and
   integrating the transformed luminance frame and the two transformed chrominance frames to produce a transformed output frame.

9. The method of claim 8 further comprising encoding the map to produce a compressed map.

10. The method of claim 9 wherein the map is encoded using a variable-length coding algorithm.

11. The method of claim 9 wherein the map is encoded using one of a Content-Adaptive Variable length coding algorithm and a Content-Adaptive Binary Arithmetic Coding algorithm.

12. The method of claim 8 further comprising:
   encoding the map to produce a compressed map; and
   transmitting the compressed map and the transformed output frame to an encoder.

13. The method of claim 12 wherein the encoder is one of an MPEG1 encoder, an MPEG2 encoder, an MPEG4 encoder, and an AVC encoder.

14. An article of manufacture for use by a device having a processing unit, the article of manufacture comprising:
   at least one computer usable media including at least one computer program embedded therein, the at least one computer program being adapted to cause the device to perform:
      decomposing an input frame into a luminance frame and two chrominance frames, the luminance frame having a plurality of luminance pixels, and each of the two chrominance frames having a plurality of chrominance pixels;

reordering the plurality of luminance pixels on the basis of each of the plurality of luminance pixels to produce a transformed luminance frame having a plurality of transformed luminance pixels;

creating a map describing a relationship between the plurality of luminance pixels of the luminance frame and the plurality of transformed luminance pixels of the transformed luminance frame;

reordering the plurality of chrominance pixels in each of the two chrominance frames according to the map to produce two transformed chrominance frames; and integrating the transformed luminance frame and the two transformed chrominance frames to produce a transformed output frame.

15. A system comprising:

a device having a processing unit capable of executing software routines, and programming logic executed by the processing unit, wherein the programming logic comprises:

means for decomposing an input frame into a luminance frame and two chrominance frames, the luminance frame having a plurality of luminance pixels, and each of the two chrominance frames having a plurality of chrominance pixels;

means for reordering the plurality of luminance pixels on the basis of each of the plurality of luminance pixels to produce a transformed luminance frame having a plurality of transformed luminance pixels;

means for creating a map describing a relationship between the plurality of luminance pixels of the luminance frame and the plurality of transformed luminance pixels of the transformed luminance frame;

means for reordering the plurality of chrominance pixels in each of the two chrominance frames according to the map to produce two transformed chrominance frames; and means for integrating the transformed luminance frame and the two transformed chrominance frames to produce a transformed output frame.

16. A method comprising:

decomposing a first input frame into a first luminance frame and a first plurality of chrominance frames, the first luminance frame having a first plurality of luminance pixels, and each of the first plurality chrominance frames having a first plurality of chrominance pixels;

reordering the first plurality of luminance pixels on the basis of each of the first plurality of luminance pixels to produce a first transformed luminance frame having a first plurality of transformed luminance pixels;

creating a first map describing a relationship between the first plurality of luminance pixels of the first luminance frame and the first plurality of transformed luminance pixels of the first transformed luminance frame;

reordering the first plurality of chrominance pixels in each of the first plurality of chrominance frames according to the map to produce a first plurality of transformed chrominance frames;

integrating the first transformed luminance frame and the first plurality of transformed chrominance frames to produce a first transformed output frame;

decomposing a second input frame into a second luminance frame and a second plurality of chrominance frames, the second luminance frame having a second plurality of luminance pixels, and each of the second plurality of chrominance frames having a second plurality of chrominance pixels;

reordering the second plurality of luminance pixels according to the first map to produce a second transformed luminance frame;

reordering the second plurality of chrominance pixels for each of the second plurality of chrominance frames according to the first map to produce a second plurality of transformed chrominance frames; and integrating the second transformed luminance frame and the second plurality of transformed chrominance frames to produce a second transformed output frame.

17. The method of claim 16 further comprising encoding the first map to produce a first compressed map.

18. The method of claim 17 wherein the first map is encoded using a variable-length coding algorithm.

19. The method of claim 17 wherein the first map is encoded using one of a Content-Adaptive Variable length coding algorithm and a Content-Adaptive Binary Arithmetic Coding algorithm.

20. The method of claim 16 further comprising:

encoding the first map to produce a first compressed map;

transmitting the first compressed map and the first transformed output frame to an encoder; and transmitting the second transformed output frame to the encoder.

21. A method comprising:

decomposing an input frame into a first component frame and a plurality of additional component frames, wherein each of the first component frame and the plurality of additional component frames has a plurality of data blocks, and wherein each of the plurality of data blocks has a plurality of decomposed pixels;

calculating a data block value for each of the plurality of data blocks of the first component frame, wherein each data block value is a function of the plurality of decomposed pixels in each data block of the first component frame;

reordering the plurality of data blocks of the first component frame on the basis of the data block values of the plurality of data blocks of the first component frame to produce a first transformed frame having a plurality of transformed data blocks;

creating a map describing a relationship between the plurality of data blocks of the first component frame and the plurality of transformed data blocks of the first transformed frame;

reordering the plurality of data blocks of each of the plurality of additional component frames according to the map to produce a plurality of additional transformed frames; and integrating the first transformed frame and the plurality of additional transformed frames to produce a transformed output frame.

22. The method of claim 21 wherein the plurality of decomposed pixels of the first component frame is a plurality of luminance pixels.

23. The method of claim 21 further comprising encoding the map to produce a compressed map.

24. The method of claim 23 wherein the map is encoded using a variable-length coding algorithm.

25. The method of claim 21 further comprising:

encoding the map to produce a compressed map; and transmitting the compressed map and the transformed output frame to an encoder.

26. A method comprising:
   decomposing an input frame into a luminance frame and two chrominance frames, the luminance frame having a plurality of luminance data blocks,
      wherein each of the plurality of luminance data blocks is comprised of a plurality of luminance pixels, and
      wherein each of the two chrominance frames has a plurality of chrominance data blocks;
   calculating a plurality of data block values for the plurality of luminance data blocks, wherein each of the plurality of data block values is a function of the plurality of luminance pixels in each luminance data block;
   reordering the plurality of luminance data blocks on the basis of the plurality of data block values to produce a transformed luminance frame having a plurality of transformed luminance data blocks;
   creating a map describing a relationship between the plurality of luminance data blocks of the luminance frame and the plurality of transformed luminance data blocks of the transformed luminance frame;
   reordering the plurality of chrominance data blocks in each of the two chrominance frames according to the map to produce two transformed chrominance frames; and
   integrating the transformed luminance frame and the two transformed chrominance frames to produce a transformed output frame.

27. The method of claim 26 further comprising encoding the map to produce a compressed map.

28. The method of claim 27 wherein the map is encoded using a variable-length coding algorithm.

29. The method of claim 26 further comprising:
   encoding the map to produce a compressed map; and
   transmitting the compressed map and the transformed output frame to an encoder.

30. An article of manufacture for use by a device having a processing unit, the article of manufacture comprising:
   at least one computer usable media including at least one computer program embedded therein, the at least one computer program being adapted to cause the device to perform:
      decomposing an input frame into a luminance frame and two chrominance frames, the luminance frame having a plurality of luminance data blocks,
         wherein each of the plurality of luminance data blocks is comprised of a plurality of luminance pixels, and
         wherein each of the two chrominance frames has a plurality of chrominance data blocks;
      calculating a plurality of data block values for the plurality of luminance data blocks, wherein each of the plurality of data block values is a function of the plurality of luminance pixels in each luminance data block;
      reordering the plurality of luminance data blocks on the basis of the plurality of data block values to produce a transformed luminance frame having a plurality of transformed luminance data blocks;
      creating a map describing a relationship between the plurality of luminance data blocks of the luminance frame and the plurality of transformed luminance data blocks of the transformed luminance frame;
      reordering the plurality of chrominance data blocks in each of the two chrominance frames according to the map to produce two transformed chrominance frames; and
      integrating the transformed luminance frame and the two transformed chrominance frames to produce a transformed output frame.

31. A system comprising:
   a device having a processing unit capable of executing software routines, and programming logic executed by the processing unit, wherein the programming logic comprises:
   means for decomposing an input frame into a luminance frame and two chrominance frames, the luminance frame having a plurality of luminance data blocks,
      wherein each of the plurality of luminance data blocks is comprised of a plurality of luminance pixels, and
      wherein each of the two chrominance frames has a plurality of chrominance data blocks;
   means for calculating a plurality of data block values for the plurality of luminance data blocks, wherein each of the plurality of data block values is a function of the plurality of luminance pixels in each luminance data block;
   means for reordering the plurality of luminance data blocks on the basis of the plurality of data block values to produce a transformed luminance frame having a plurality of transformed luminance data blocks;
   means for creating a map describing a relationship between the plurality of luminance data blocks of the luminance frame and the plurality of transformed luminance data blocks of the transformed luminance frame;
   means for reordering the plurality of chrominance data blocks in each of the two chrominance frames according to the map to produce two transformed chrominance frames; and
   means for integrating the transformed luminance frame and the two transformed chrominance frames to produce a transformed output frame.

32. A method comprising:
   decomposing a transformed frame of data into a transformed luminance frame and two transformed chrominance frames, wherein the transformed luminance frame and the two transformed chrominance frames each comprise transformed pixel data that is ordered within each frame on the basis of pixel luminance values;
   inverse transforming the transformed luminance frame and the two transformed chrominance frames according to a map to create a reconstructed luminance frame and two reconstructed chrominance frames, wherein the map describes a relationship between the transformed pixel data of the transformed luminance frame and original pixel data of an original luminance frame; and
   integrating the reconstructed luminance frame and the two reconstructed chrominance frames to produce a reconstructed integrated frame.

33. The method of claim 32 wherein the map is a decoded map, the method further comprising decoding a compressed map to produce the decoded map.

34. The method of claim 33 wherein the compressed map is decoded using a variable-length decoding algorithm.

35. The method of claim 33 wherein the compressed map is decoded using one of a Content-Adaptive Variable length decoding algorithm and a Content-Adaptive Binary Arithmetic decoding algorithm.

36. An article of manufacture for use by a device having a processing unit, the article of manufacture comprising:
   at least one computer usable media including at least one computer program embedded therein, the at least one computer program being adapted to cause the device to perform:
      decomposing a transformed frame of data into a transformed luminance frame and two transformed chrominance frames, wherein the transformed luminance frame and the two transformed chrominance frames each comprise transformed pixel data that is ordered within each frame on the basis of pixel luminance values;

inverse transforming the transformed luminance frame and the two transformed chrominance frames according to a map to create a reconstructed luminance frame and two reconstructed chrominance frames, wherein the map describes a relationship between the transformed pixel data of the transformed luminance frame and original pixel data of an original luminance frame; and integrating the reconstructed luminance frame and the two reconstructed chrominance frames to produce a reconstructed integrated frame.

37. A system comprising:

a device having a processing unit capable of executing software routines, and programming logic executed by the processing unit, wherein the programming logic comprises:

means for decomposing a transformed frame of data into a transformed luminance frame and two transformed chrominance frames, wherein the transformed luminance frame and the two transformed chrominance frames each comprise transformed pixel data that is ordered within each frame on the basis of pixel luminance values;

means for inverse transforming the transformed luminance frame and the two transformed chrominance frames according to a map to create a reconstructed luminance frame and two reconstructed chrominance frames, wherein the map describes a relationship between the transformed pixel data of the transformed luminance frame and original pixel data of an original luminance frame; and means for integrating the reconstructed luminance frame and the two reconstructed chrominance frames to produce a reconstructed integrated frame.

\* \* \* \* \*